US008681213B1

(12) United States Patent
Demetrescu

(10) Patent No.: US 8,681,213 B1
(45) Date of Patent: Mar. 25, 2014

(54) MOTION PICTURE FILM SCANNER WITH AUTOMATED FAILED SPLICE RECOVERY

(71) Applicant: Lasergraphics Inc., Irvine, CA (US)

(72) Inventor: Stefan Demetrescu, Irvine, CA (US)

( * ) Notice: Subject to any disclaimer, the term of this patent is extended or adjusted under 35 U.S.C. 154(b) by 0 days.

(21) Appl. No.: 14/019,533

(22) Filed: Sep. 5, 2013

(51) Int. Cl.
 H04N 7/01 (2006.01)
 G03B 21/00 (2006.01)
 H04N 9/31 (2006.01)
 H04N 5/77 (2006.01)

(52) U.S. Cl.
 CPC .......... *H04N 7/01* (2013.01); *G03B 21/00* (2013.01); *H04N 9/31* (2013.01); *H04N 5/77* (2013.01)
 USPC ............................................. 348/97; 352/38

(58) Field of Classification Search
 None
 See application file for complete search history.

(56) References Cited

U.S. PATENT DOCUMENTS

| | | | |
|---|---|---|---|
| 2,486,204 A | | 10/1949 | Praizner |
| 3,627,922 A | * | 12/1971 | Goldmark et al. ............ 348/100 |
| 3,628,855 A | | 12/1971 | Harvey |
| 4,152,053 A | | 5/1979 | Menary |
| 4,198,136 A | * | 4/1980 | Staudacher et al. .......... 352/169 |
| 4,524,392 A | | 6/1985 | Poetsch |
| 4,782,546 A | | 11/1988 | George et al. |
| 5,083,860 A | | 1/1992 | Miyatake et al. |
| 5,157,482 A | | 10/1992 | Cosgrove |
| 5,671,008 A | | 9/1997 | Linn |
| 5,673,098 A | | 9/1997 | Sakashita et al. |
| 5,838,364 A | * | 11/1998 | Ishibe et al. ..................... 348/96 |
| 5,841,512 A | | 11/1998 | Goodhill |
| 5,850,253 A | * | 12/1998 | Inoue et al. ..................... 348/96 |
| 5,995,470 A | | 11/1999 | Tsubaki et al. |
| 6,094,217 A | * | 7/2000 | Nishimura ..................... 348/96 |
| 6,317,194 B1 | * | 11/2001 | Suzuki et al. ..................... 355/41 |
| 6,381,042 B1 | | 4/2002 | Batchelder et al. |
| 6,646,679 B2 | * | 11/2003 | Ishibe et al. ............. 348/207.99 |
| 6,844,894 B1 | | 1/2005 | Hunt et al. |
| 7,020,390 B2 | * | 3/2006 | Maeda et al. ..................... 396/2 |
| 7,817,844 B2 | * | 10/2010 | Kitamura et al. ............. 382/141 |

(Continued)

FOREIGN PATENT DOCUMENTS

| | | |
|---|---|---|
| CA | 2010259 A1 | 8/1991 |
| JP | 59180646 A | 10/1984 |

(Continued)

OTHER PUBLICATIONS

Corrigan et al., "Algorithms for the Digital Restoration of Torn Films," IEEE Trans. on Image Processing, vol. 21, No. 2, Feb. 2012, pp. 573-587.*

(Continued)

*Primary Examiner* — Jay Au
*Assistant Examiner* — Reza Aghevli
(74) *Attorney, Agent, or Firm* — Stone Creek Services LLC; Alan M. Flum

(57) ABSTRACT

Disclosed is a system and method for digitally scanning motion picture film with automatic recovery after a failed splice or break is repaired. The system includes a motion picture film digital scanner. Software executed on a processor either integrated within the motion picture film digital scanner or in an external computer communicating with the motion picture film digital scanner detects film breakage. When an operator signals that the splice repair operation is complete, the software directs the scanner to rewind the film by a pre-determined amount and resume scanning. The software automatically, and seamlessly, merges the scan sequences from before and after the splice repair operation.

16 Claims, 13 Drawing Sheets

(56) References Cited

U.S. PATENT DOCUMENTS

| | | | |
|---|---|---|---|
| 8,031,947 B2 * | 10/2011 | Jacobsen | 382/199 |
| 8,290,334 B2 | 10/2012 | Demeyer | |
| 2004/0013842 A1 | 1/2004 | Bougy | |
| 2004/0222392 A1 | 11/2004 | Sander et al. | |
| 2005/0041099 A1 | 2/2005 | Nemiroff | |
| 2006/0023171 A1 * | 2/2006 | Miyasaka | 353/88 |
| 2008/0117293 A1 | 5/2008 | Kuramoto | |
| 2008/0297598 A1 | 12/2008 | Peters et al. | |
| 2011/0129200 A1 * | 6/2011 | Higeta | 386/264 |
| 2012/0201518 A1 | 8/2012 | Singer | |
| 2013/0076890 A1 * | 3/2013 | Bovee | 348/97 |

FOREIGN PATENT DOCUMENTS

| | | | |
|---|---|---|---|
| WO | 2011112507 A1 | 9/2011 | |
| WO | 2012142518 A2 | 10/2012 | |
| WO | 2013043593 A1 | 3/2013 | |

OTHER PUBLICATIONS

Golden Eye Restoration, Archive, DI, Apr. 3, 2012, Digital Vision, Hollywood, CA.

Press Announcement: P+S Technik launches new Digital Splice Repair Module for the SteadyFrame Universal Format Scanner at NAB 2010, May 14, 2009, P+S Technik, Germany.

Reliance relies on the SteadyFrame Universal Format Scanner from P+S Technik, Making: People, Technology, Companies, Aug. 31, 2011, accessed on the Internet at: http://mbmc- uk.blogspot.com/2011/08/reliance-relies-on-steadyframe.html on Apr. 23, 2013.

DaVinci Revival, Black Magic Design, accessed on the Internet at: http://www.blackmagicdesign.com/products/davincirevival/software/ on Apr. 24, 2013.

A W Gruen, Adaptive Least Squares Correlation: A Powerful Image Matching Technique, South African Journal of Photogrammetry, Remote Sensing and Cartography, 1985, pp. 175-187, vol. 4, No. 3, South African Society for Photogrammetry, Remote Sensing and Cartography, Newlands, South Africa.

CIR Cinema General Catalogue 2010/2011, Sep. 17, 2010, pp. 24-25, Cir Srl, Rome, Italy.

David Corrigan, Naomi Harte, Algorithms for Digital Restoration of Torn Films, p. 573, Feb. 2012, IEEE Transactions on Image Processing, vol. 21, No. 2, IEEE, New York, NY.

P+S Technik launches new Digital Splice Repair Module for the SteadyFrame Universal Format Scanner at NAB 2010 CreativeCow. net, accessed on the Internet at: http://news.creativecow.net/story/863818 on Sep. 1, 2013.

Wenjing Jia et al., A Comparison on Histogram Based Image Matching Methods, Proceedings of the IEEE International Conference on Video and Signal Based Surveillance 2006, Nov. 2006, pp. 97, IEEE Computer Society, Washington, DC.

Image comparison—fast algorithm, Stackflow, accessed on the Internet at stackoverflow.com/questions/843972/image-comparison-fast-algorithm on Aug. 28, 2013.

* cited by examiner

MOTION PICTURE FILM SCANNER WITH AUTOMATED FAILED SPLICE RECOVERY

BACKGROUND

The present disclosure relates to motion picture film scanning equipment. Specifically, the present disclosure relates to systems, apparatus, and methods for digitally scanning motion picture film.

In the past, motion pictures were shot and projected using photographic film such as 8 mm, 16 mm, 35 mm and other film stock. Because of cost savings and convenience, digital projection systems are replacing film projection equipment and motion pictures are often being digitally shot and stored as opposed to being shot with film. Motion pictures shot using film are generally edited digitally. Older and classic motion picture films are being archived and re-mastered digitally. All of these trends require that the images on film be transferred to digital media.

Transferring film footage into digital media requires that the film be scanned or digitized. The film images can be directly scanned into digital data stream. The scanned images are stored on computer readable medium such as a hard drive or flash memory in file formats such as TIFF, DPX, and QuickTime ProRes. This is in contrast to an older process known as telecine where film images were transferred in real-time into a video signal, which would typically be attached to a video tape recorder.

Splicing is the process of joining two pieces of film together. Splices are generally made when repairing damaged or broken film, or when editing sections of film together. A single 1000 ft. (304.8 m) reel of older or classic film may contain over a hundred splices. A two-hour full-length classic motion picture would require eleven 1000 ft. (304.8 m) reels and therefore, may include well over a thousand splices.

Film splices can be made using adhesive tape, or using a liquid adhesive, that bond the two ends of the film together. As time passes, the adhesive holding the splice together weakens and the film becomes brittle. It is common for old film splices or even non-spliced, but damaged film sections, to cause the film to break during the scanning process.

Film defects, such as bad splices, or partial tears, cause the motion picture film scanning process to be inefficient and labor-intensive. Before scanning begins, the film may be put through a pre-inspection and editing/repair process, to circumvent potential problems. Nonetheless, problems can occur. Each time the film breaks during scanning, the scanning station operator unloads the film reel from the scanner. The scan station operator sends the reel of film to the repair/editing station or optionally first back to the pre-inspection station. After the splice or break is repaired, the film reel is sent back to the scan station operator. The scan station operator typically re-scans the entire reel from the beginning in order to generate a single uninterrupted digital output stream. By this method, each time a splice fails or the film breaks, the reel would have to be rescanned from the beginning. For example, if there were five splice failures, or five breaks, than the reel would end up being rescanned from the beginning five times.

Instead of scanning the entire scan sequence from the beginning each time the film breaks, the scan operator can save the scan file created before the break, and scan the material after each break into separate scan files. The scan operator can then transfer all the files to a digital video editing station where the files can later be manually edited together. While this process is less time consuming than scanning from the beginning, it requires a person skilled in digital video editing software to carefully stich together the separate pieces while not duplicating or omitting any frames in the area of the stitching and has the potential to be time consuming, labor intensive, and inconvenient.

SUMMARY

Disclosed in several aspects is a system, apparatus, and method that overcomes many of the above-described difficulties associated with digitally scanning motion picture film. The system includes a motion picture film digital scanning system where after a splice fails and the film breaks, the operator can inspect and repair the splice, in-place, without removing the digital motion picture film portion or film reel from the motion picture film digital scanning system. After the operator completes the splice, he or she signals the motion picture film digital scanning system that the splice repair is complete. The system automatically rewinds the film a predetermined or preset distance, and/or the operator performs a manual rewind himself, and automatically restarts the scanning operation. This creates two digital scan sequences. The first scan sequence was created before the splice failed and the film broke, the second scan sequence is created when scanning resumes after the repair operation. The second scanned sequence commences at a position in the motion picture film portion before a last scanned frame of the first scan sequence. The software within the motion picture film digital scanning system identifies automatically one or more overlapping frames from the first and second scan sequences, and automatically and seamlessly edits together the two sequences, discarding any redundant frames from the resulting merged sequence. The process can be automatically repeated with each splice failure or film break until the entire reel of film is scanned. The process of automatically and seamlessly editing the two sequences together can be implemented in real-time while the second sequence is being digitized. Alternatively, all of the sequences that were separately digitized as a result of a failed splice can be automatically edited together after the entire reel has been digitized. In either case, the result is a single continuous file or sequence of images that represents the entire digitized motion picture film portion or reel without the need for any manual editing, even if the film breaks multiple times during the scanning process.

The motion picture film digital scanning system can include a motion picture scanner and a separate computer and monitor. One or more processors within the computer can control the scanner operation and implement part or all of the above-described sequence. Alternatively, the motion picture film digital scanning system can be implemented with the scanner, computer display monitor, and one or more processors, within an enclosure as an integral unit.

A method for automatically recovering after a failed splice or film break on a motion picture film digital scanning system can be implemented using the following steps performed by one or more processors associated with the motion picture film digital scanning system: (1) Digitally scan a motion picture film portion, creating a first scan sequence. (2) Automatically stop the scanning process, in response to the motion picture film portion breaking (3) Automatically rewind the motion picture film portion by a predetermined distance in response to a user generated input signaling that the re-splicing operation has been completed. If the user has chosen to rewind manually, then this step 3 is omitted. (4) Resume scanning automatically, creating a second scan sequence. The second scan sequence will include, proximate to its start, some of the same frames that were present from the end of the first scan sequence. (5) Automatically identify one or more of the overlapping frames from the first and second scan sequences. (6) Automatically and seamlessly edit together the first and second scan sequences, discarding redundant frames from a resulting merged sequence.

The scanning process can continue until either the film portion ends or breaks again. Each time the film breaks, a new scan sequence is automatically created and seamlessly merged with the old scan sequence until the scanning of the film portion is completed. The result is a complete scanned reel that did not require the film reel or film portion be scanned from the beginning each time the film broke. The process also did not require manual editing to rejoin the separate digital portions generated each time the film breaks. With an optional inspection table integral to the motion picture film digital scanner, the entire process may be carried out on the motion picture film digital scanner without removing the film from the scanner.

This Summary has introduced a selection of concepts, including both a system and method, in simplified form, that are described in more detail in the Description. These are described here in order to aid in the understanding of both the Description and the Claims. The Summary is not intended to identify essential features or limit the scope of the claimed subject matter.

DRAWINGS

DESCRIPTION

Figure 1:
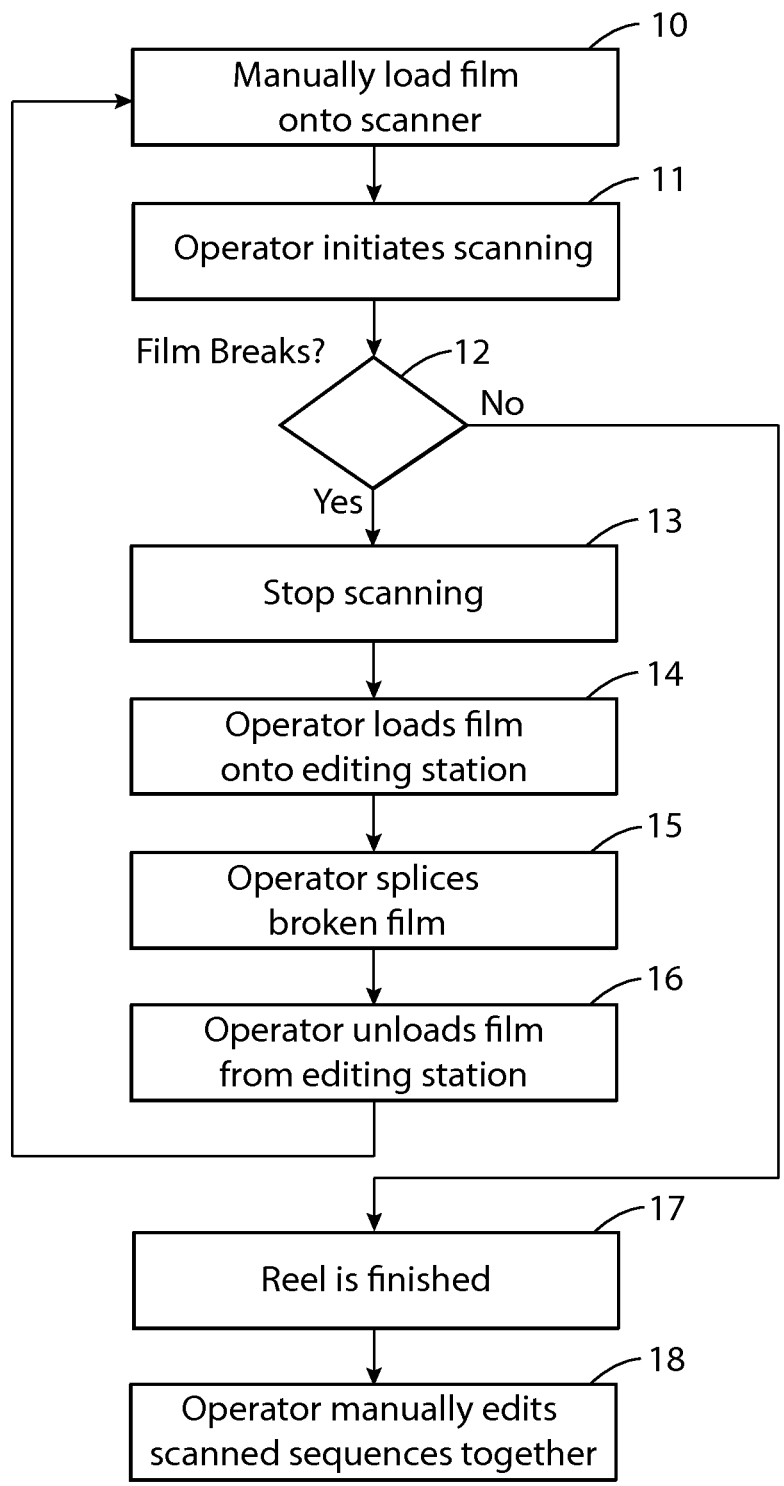
FIG. 1 shows a typical sequence of scanning a motion picture film and manually recovering after a failed splice or break in the prior art.

The following description is made with reference to figures, where like numerals refer to like elements throughout the several views, FIG. 1 shows a typical sequence of scanning a motion picture film and manually recovering after a failed splice, in the prior art. In step 10, the motion picture film is manually loaded onto a motion picture film scanning device. In step 11, the operator instructs the motion picture film scanning device to start digitizing or scanning the motion picture film. In step 12, if the film breaks, then in step 13 scanning can be automatically stopped. For example, the motor drive mechanism can automatically disengage when a tension arm servo detects that there is no longer any tension or pressure on the tension arm. In step 14, the operator manually unloads the motion picture film from the motion picture film scanning device and loads it onto a separate editing/repair station. In step 15, an operator of the editing/repair station splices the broken film together and then unloads the film from the editing/repair station in step 16. The film is then manually reloaded onto the film scanner in step 10. The operator again initiates the scanning processing from the beginning of the film reel. The entire process of steps 10 through step 16 are repeated each time the film breaks, rescanning the film from the beginning each time until, in step 17, reel is finished.

Alternatively, instead of rescanning the motion picture film portion from the beginning each time the film breaks and is repaired, the operator may choose to start scanning a portion of the film proximate to the were the film broke. The process of steps 10 through step 16 are repeated each time the film breaks, creating separate scan files after each break until, in step 17 the reel is finished. In step 18, the separate sequences would then need to be manually edited together using a digital motion picture editing software; for example, Avid Media Composer, Apple Final Cut Pro, or Adobe Premiere.

Figure 2:
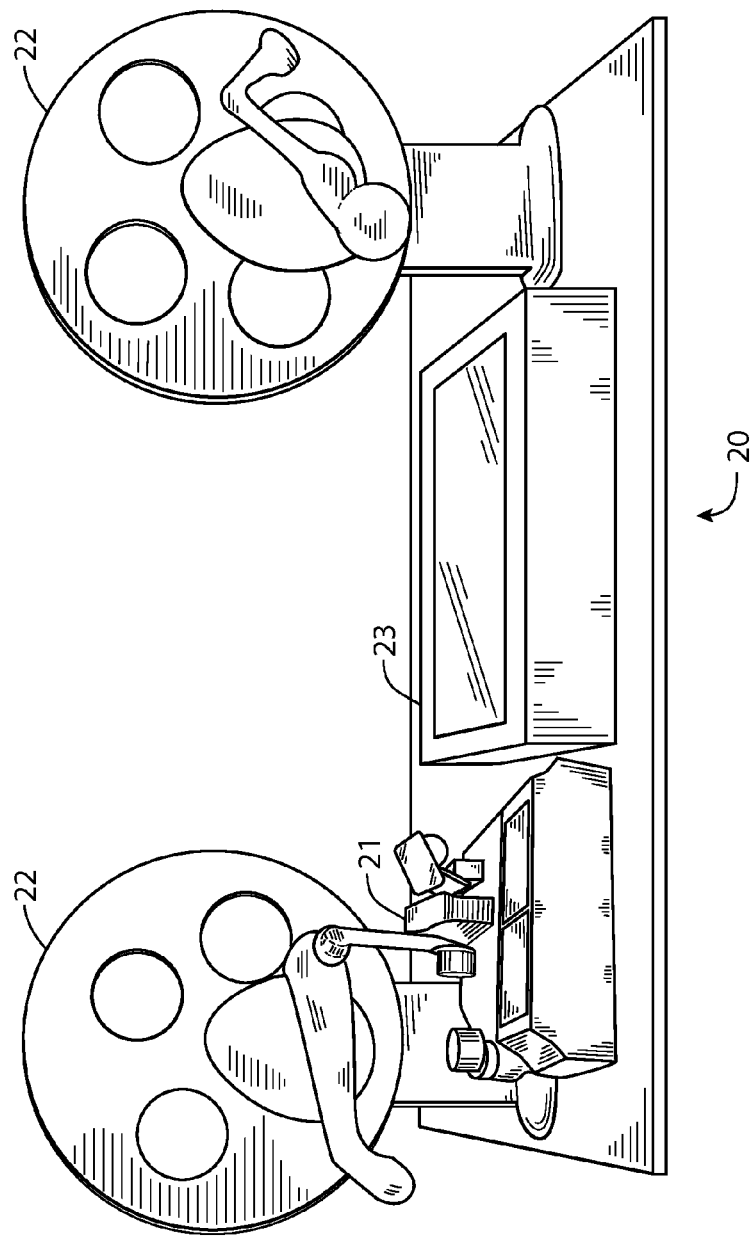
FIG. 2 shows a motion picture film editing station and hand splicing device in the prior art.

FIG. 2 shows a motion picture film editing/repair station 20 and hand-splicing device 21, in the prior art that could be used for step 15 of FIG. 1. The motion picture film editing/repair station 20 includes hand cranked reels 22 and a light box 23.

Referring back to FIG. 1, after the edit/repair station operator unloads the film from the motion picture film from the edit/repair station, the film is carried back to motion picture film scanning device, and manually re-loaded on to the scanning device again, in step 10.

As previously, described in the Background section, this procedure can be time consuming and labor-intensive. Each time the splice fails and the film breaks, the motion picture film is removed from the motion picture film scanning device, loaded on the edit/repair station, spliced, reloaded on motion picture film scanning device, where scanning is often restarted from the beginning of the reel.

Figure 3:
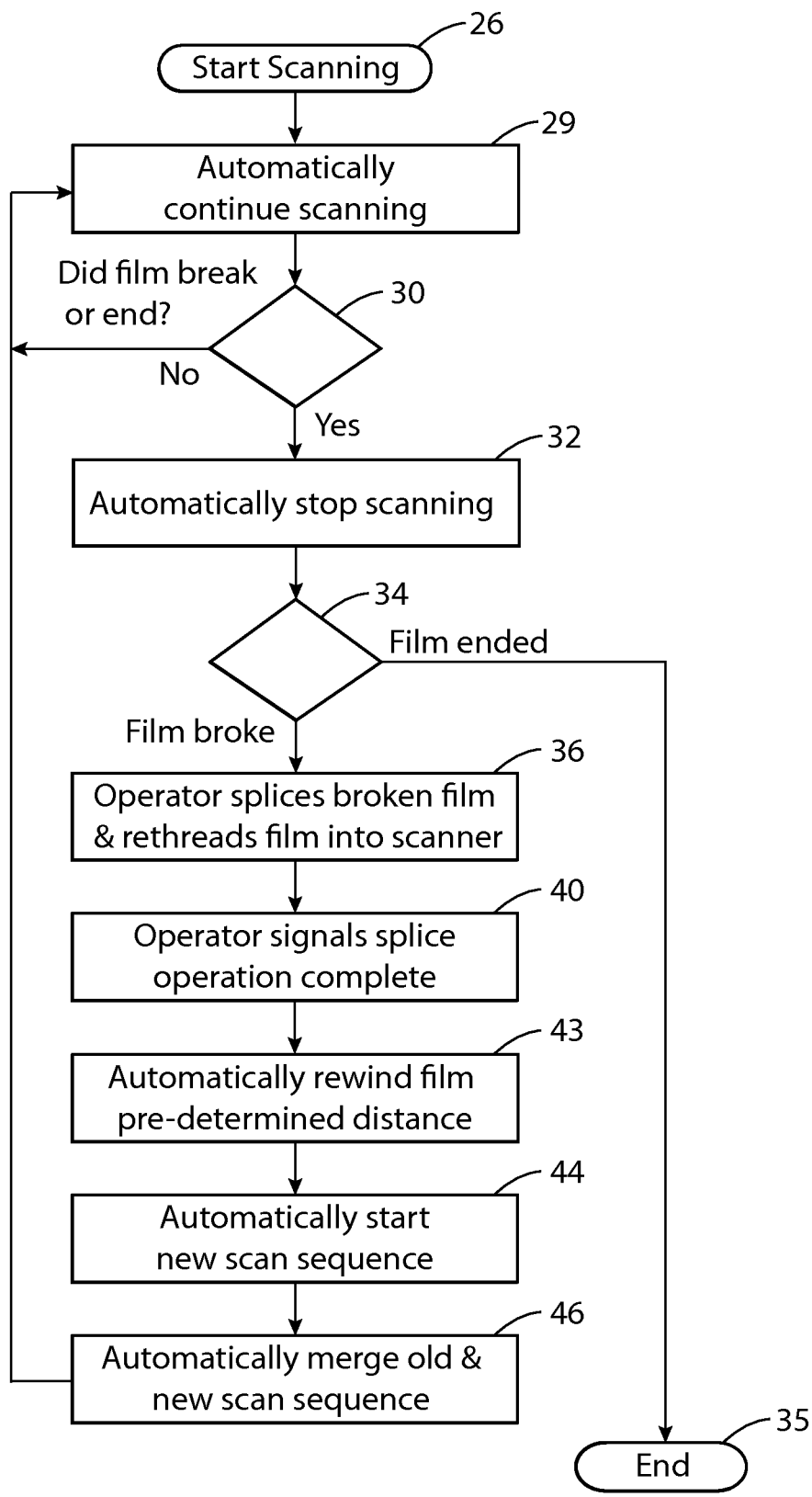
FIG. 3 shows a flow chart for the process of scanning motion picture film and automatically recovering from a failed spliced after the defect is repaired.
Figure 4:
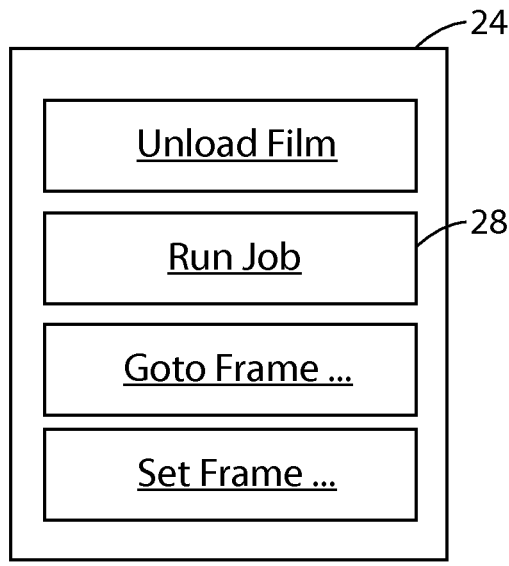
FIG. 4 shows an example of a scanning operation control section of a graphical user interface.
Figure 5:
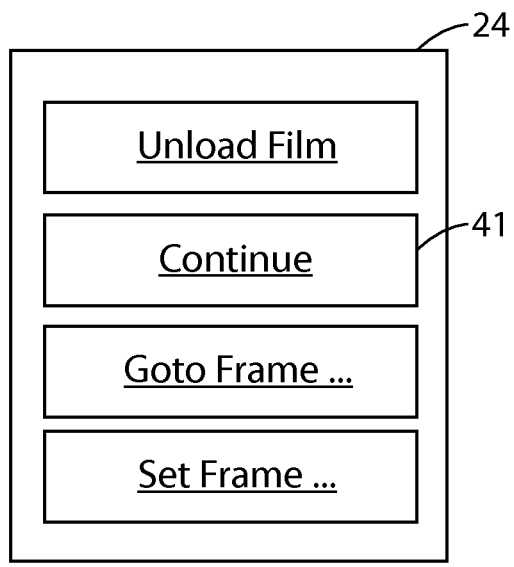
FIG. 5 shows an example of a scanning operation control section of a graphical user interface in an alternative operational state.
Figure 6:
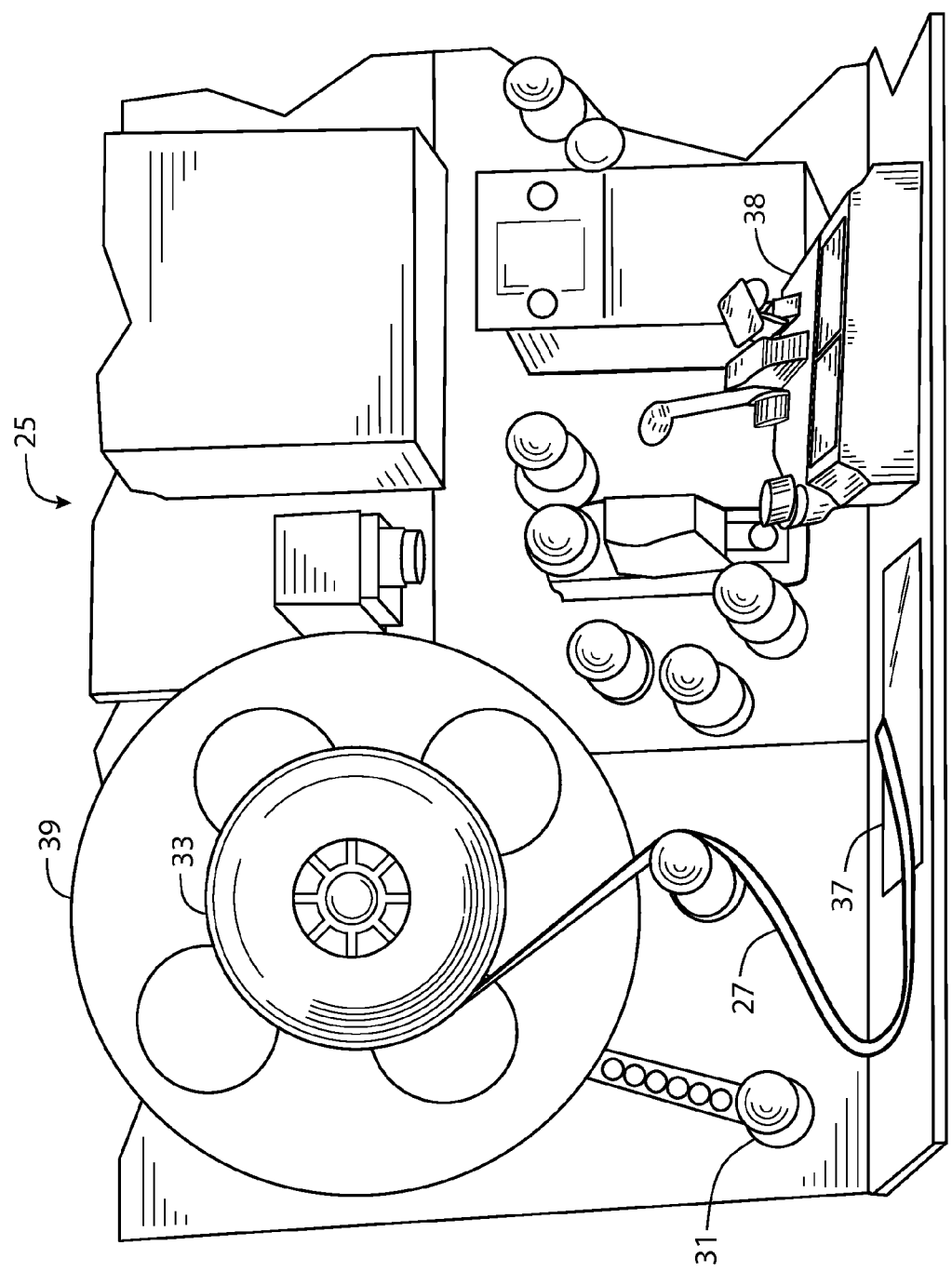
FIG. 6 shows a portion of the motion picture film digital scanning system.

In contrast, FIGS. 3-15 show a process, system, and apparatus for scanning motion picture film and automatically recovering from a failed splice or film break after the defect is repaired, and overcomes the above-described shortcoming. FIG. 3 shows a flow chart for the process of scanning motion picture film and automatically recovering from a failed spliced or film break after the defect is repaired. FIGS. 4-5 show a scanning operation control section 24 of a graphical user interface. FIG. 6 shows a portion of the motion picture film digital scanning system 25. Referring to FIGS. 3-6, in step 26, the scanning process is initiated after the motion picture film 27 is loaded on the motion picture film digital scanning system 25. Scanning can be initiated by selecting a button on a graphical user interface, for example, the run job button 28 of FIG. 4, or alternatively, by a hardware button on the motion picture film digital scanning system 25, or by specific vocal commands or gestures.

Referring again to FIGS. 3 and 6, in step 29, scanning continues until in step 30, the motion picture film 27 either breaks or ends and in step 32, scanning will automatically stop. The computer can automatically terminate the first scan sequence. Breaking or ending of the motion picture film 27 is typically detected by release force on a tension arm 31 on the motion picture film digital scanning system 25. If in step 34, the film ended, and then the scanning process of the motion picture film reel 33 is complete and the process ends in step 35. If in step 34, the motion picture film 27 has broken, then operator manually splices the broken film together in step 36. The operator can use a built-in inspection station 37, for example, a light table that is optionally integrated within motion picture film digital scanning system 25 either alone or in combination with a splicing block 38 to help facilitate the splicing operation. This allows the splicing operation to be performed in place on the motion picture film digital scanning system 25. With the option of the built-in inspection station 37, the operator need not remove film reels 39 or the motion picture film 27 from the motion picture film digital scanning system 25 during the entire scan and repair operation.

Figure 7:
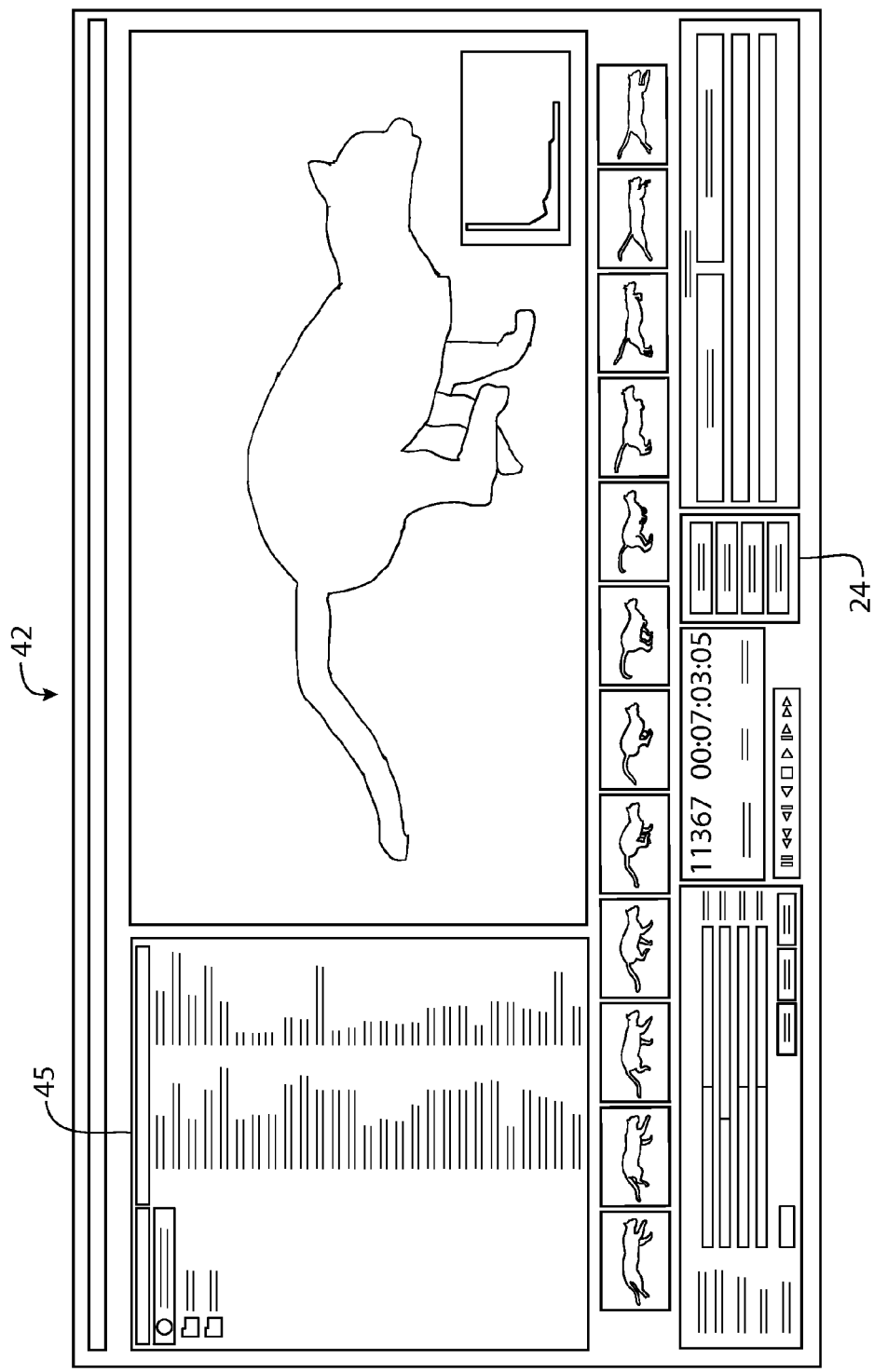
FIG. 7 shows a typical graphical user interface used in a motion picture film digital scanning system that implements the method of FIG. 3.

After the motion picture film is spliced, in step 40, the operator signals to the motion picture film digital scanning system that the splicing process is complete. The operator can resume scanning by selecting a virtual button on a graphical user interface, for example, a continue button 41 on the scanning operation control section 24 of the graphic user interface shown in FIG. 5. The continue button was the run job button 28 of FIG. 4, that contextually changed when the scanning process was initiated. FIG. 7 shows the scanning operation control section 24 in context of a graphical user interface 42. Alternatively, a hardware button can implement the same functionality or the system can be adapted to recognize specific gestures, or vocal commands.

Once the continue button 41, or its equivalent, is initiated by the user, the motion picture film digital scanning system 25, in step 43, automatically rewinds the film a pre-determined distance, unless the operator has manually rewound the film sufficiently, before starting a second scan sequence in step 44. The pre-determined distance is typically 2 ft. (0.610 m) to 3 ft. (0.914 m) although longer or shorter distances are possible. The primary purpose of rewinding the film a predetermined distance by the computer and/or the operator is to provide sufficient overlap of frames between the first and second scan sequences. A secondary, and optional purpose, is to account for a gap between the position of the image and audio track on the motion picture film 27. Motion picture film 27 often includes optical sound track proximate to the edge of the film; for example, SDDS, Digital Dolby, analog optical, or DTS time code. Films made between the early 1950s and early 1990s optionally included a magnetic sound track. The sound track is generally offset a predetermined distance from the corresponding image frame. For example, for a 35 mm analog optical track, typically has an offset of 21 frames or approximately 1.326 ft. (0.40 m). For a 35 mm magnetic sound track, the offset can be 28 frames or approximately 1.77 ft. (0.54 m). Optionally, the user may be able to pre-select the predetermined distance in a preferences panel 45 within the graphical user interface 42; both the preferences panel 45 and a graphical user interface 42 are shown in FIG. 7. Note that the preferences panel 45 can be used to set other parameters. For example, the size of the motion picture film, such as 8 mm, 16 mm, or 35 mm; the aspect ratio, for example, 1.37:1, 1.78:1, 1.85:1, or 2.40:1; or whether the film is positive or negative. The preferences panel 45 can be used to specify the digital output file type, for example, a QuickTime file, or alternatively, a sequential series of TIFF images. These are examples are not meant to be limiting, but rather to demonstrate to the reader that a wide range of parameters can be set in the preferences panel.

In step 46 of FIG. 3, the motion picture film digital scanning system identifies automatically one or more overlapping frames from the first and second scan sequences and using this information, automatically and seamlessly edits together, the first scan and second scan sequences, discarding redundant frames from a resulting merged sequence.

In step 29, the scanning continues until either the film breaks or ends in step 30. If the film ends, then the process is ended in step 35. If the film breaks, then steps 34, 36, 40, 43, 44, 46 are repeated until the film ends. Note that step 46 of merging the motion picture film scanning sequence can be performed automatically in real-time or at the end of the scan sequence in step 35.

Figure 8:
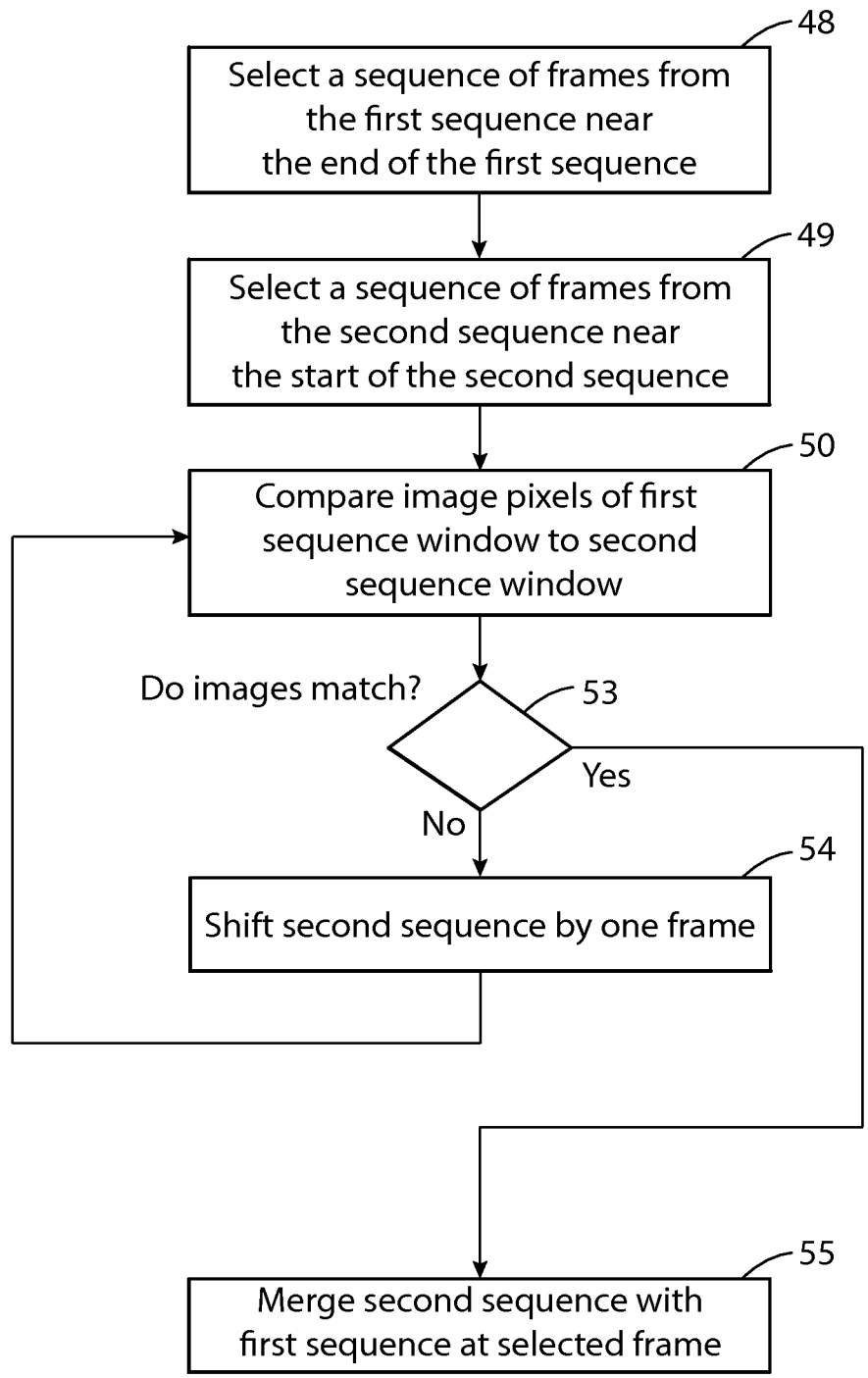
FIG. 8 shows a flow chart detailing the sequence for the step of automatically merging the old and the new scan sequence of FIG. 3.
Figure 9:
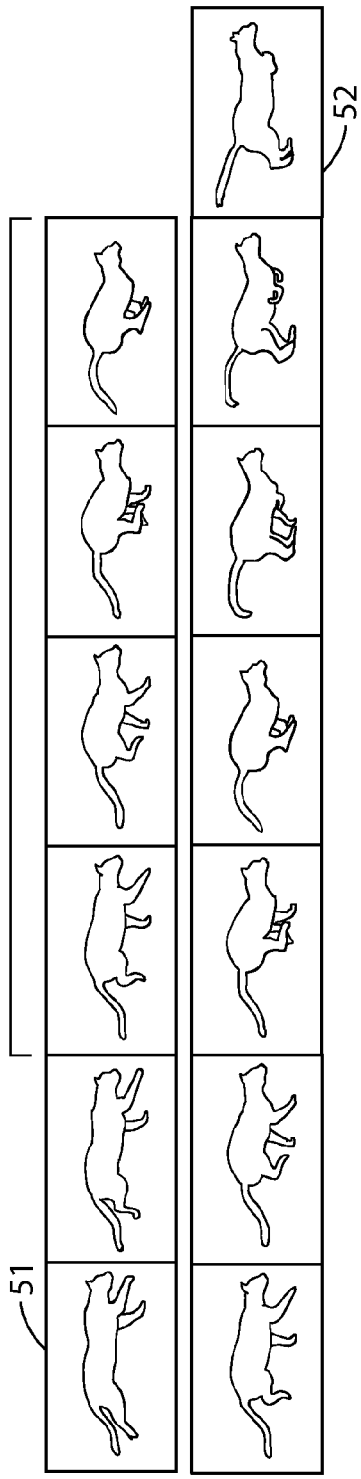
FIG. 9 shows a graphical representation of a step in the image matching sequence from FIG. 8.
Figure 10:
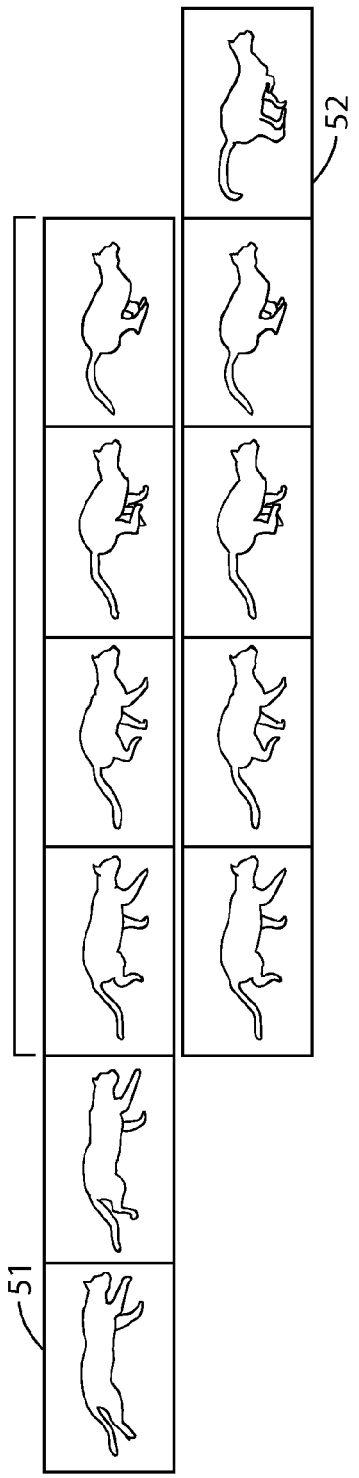
FIG. 10 shows a graphical representation of a further step in the image matching sequence from FIG. 8.
Figure 11:
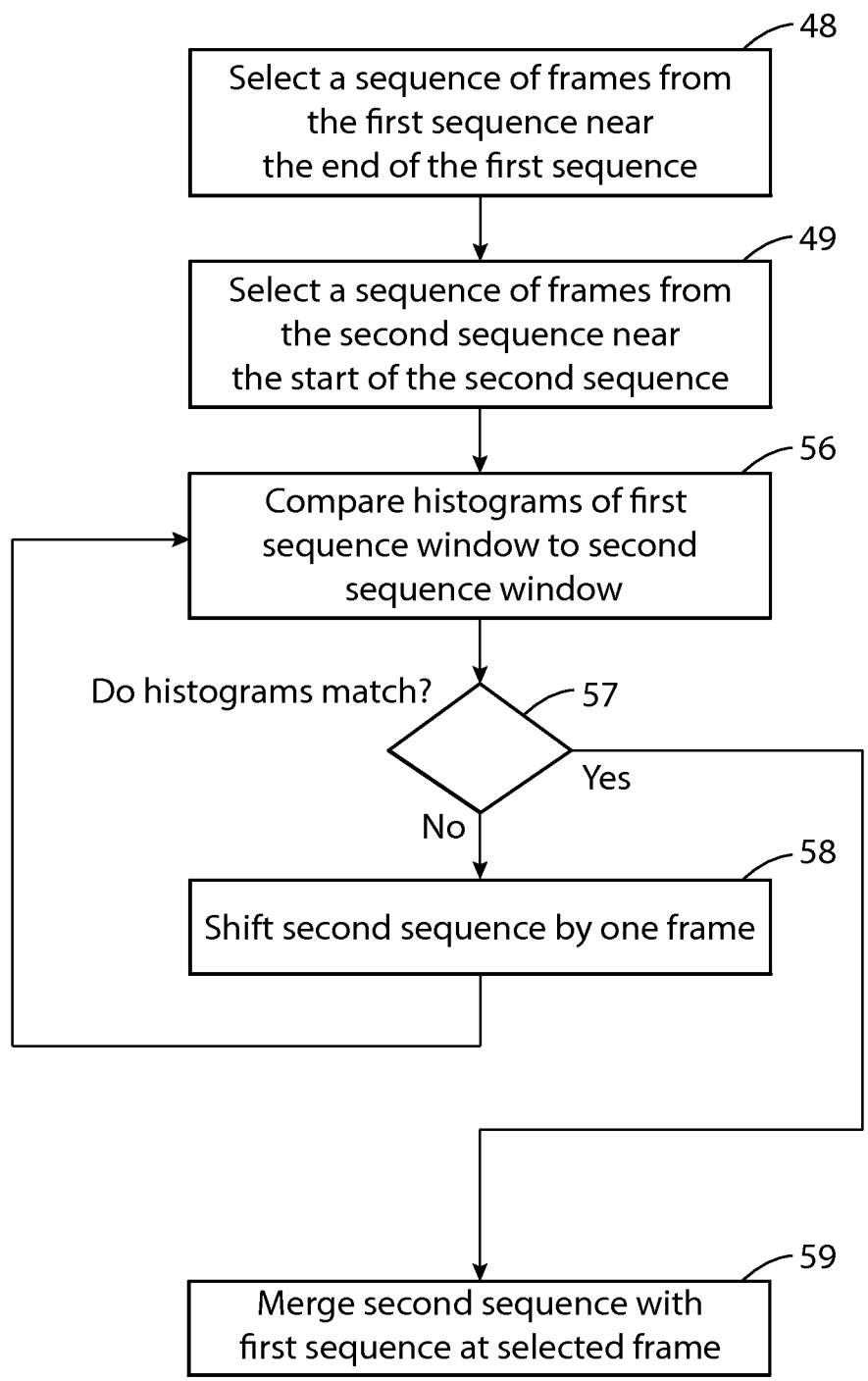
FIG. 11 shows a flow chart detailing an alternative sequence for the step of automatically merging the old and the new scan sequence of FIG. 3 by comparing histograms of the images within the old and the new sequence.
Figure 12:
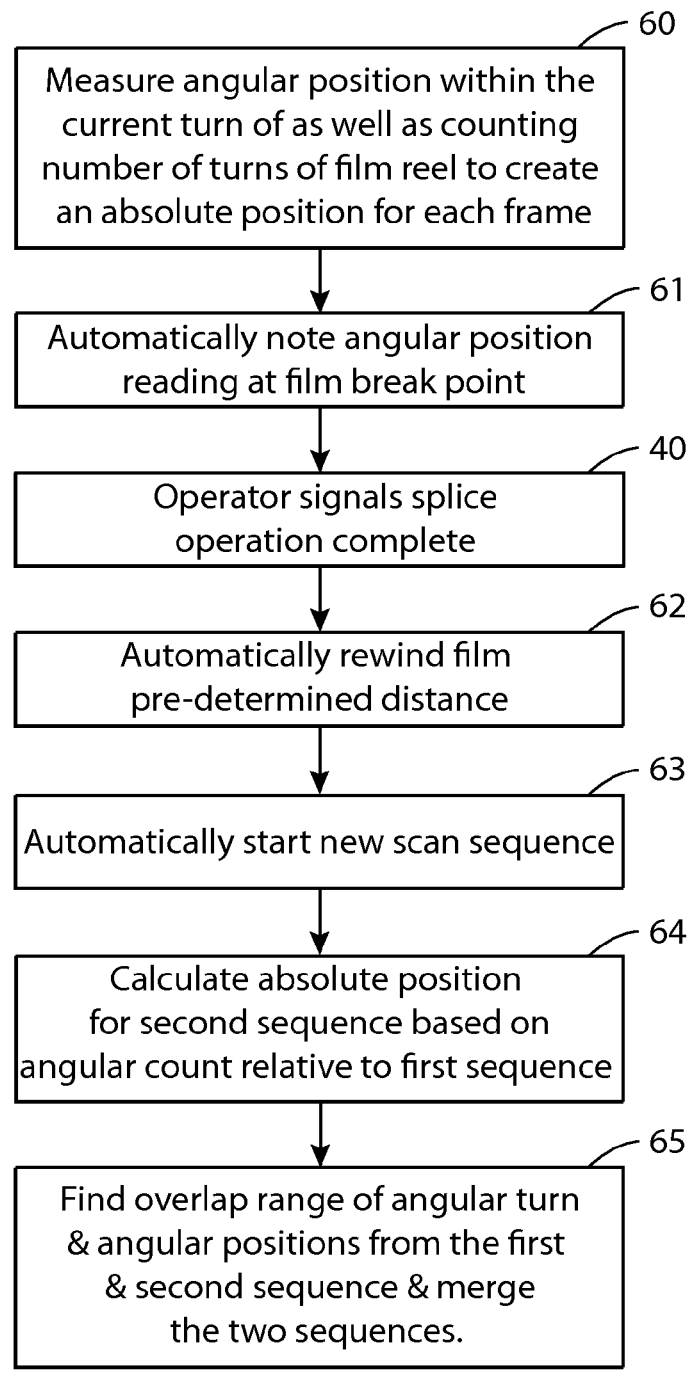
FIG. 12 shows a flow chart detailing an alternative sequence for the step of automatically merging the old and the new scan sequence of FIG. 3 by comparing angular turn and position encoder readings associated with frame positions of the old and the new sequence.

FIGS. 8-12 show processes for accomplishing the step 46 of FIG. 3 for automatically merging the first and second scan sequence together seamlessly. FIGS. 8-10 detail the step of automatically merging the first and the second scan sequence by using image matching. FIG. 11 shows a flow chart detailing an alternative sequence for the step of automatically merging the first and the second scan sequence by comparing histograms over a series of frames. FIG. 12 shows a flow chart detailing an alternative sequence for the step of automatically merging the first and the second scan sequence by comparing angular turn and position encoder readings associated with frame positions of the old and the new sequence.

Referring to FIG. 8, in step 48, a sequence of frames is selected from the first scan sequence starting with and working back from the last frame recorded before the motion picture film broke. In step 49, a sequence or window of frames is selected from second recorded sequence starting with and working forward from the first frame scanned in the second sequence. As previously described, the matched frame can be any frame in the overlap region of the first and the second scan sequences. If the matched frame were chosen to be proximate to the breakpoint, since the pre-determined rewind distance is approximately known, the window of frames in step 49 can be selected from images recorded at the estimated position where the break point was likely to have occurred. For example, the preset rewind distance is 2 ft. (0.061 m), with 24 frames per second (fps), then a good starting point to center the window of frames would be approximately 2 ft. (0.061 m) into the sequence of frames which is approximately 32 frames. Similarly, if the match point were chosen to be the proximate to the start of the second scan sequence, then the first can sequence can be offset back the number of frames proximate to where the second scan sequence would have likely to have started.

In step 50, each frame within the first window of frames is compared to the frame in the corresponding position in the second frame. For clarity, FIGS. 9-10 illustrate graphically how the first window of frames 51 and second window of frames 52 are aligned and then shifted in order to find a matching sequence. Referring to FIGS. 8-10, if each image does not match the corresponding image in step 53, then the second sequence of frames is shifted by one frame in step 54. The step of comparing each frame corresponding frame is repeated until corresponding frames within the first window of frames 51 and the second window of frames 52 match more closely than any other shift position that has been attempted. FIG. 9 illustrates sequences that are not matched while FIG. 10 illustrates sequences that are matched. Referring to FIG. 8, once the first window of frame 51 and the second window of frames 52 match, in step 55, the two sequences are merged at a selected frames with the redundant frames of either the first or second sequence discarded from the final video stream.

In FIGS. 9-10 four frames are used for each of the first window of frames 51 and the second window of frames and is depicted by a rectangular bracket above four of the frames in each of these figures. Each frame is compared to the corresponding frame pixel by pixel. The image matching can be determined by cross-correlation or similar methodology. To reduce demand on the processor, a compressed or scaled version of each image can be compared. The use of a four-frame window is simply illustrative. More frames can be used in the window for greater accuracy. Alternatively, less frames or even a single frame-by-frame comparison can be used as this requires less computation, however, this comes at the cost of accuracy; especially when the differences between frames is small; for example, in a scene with a view of a relatively static landscape.

FIG. 11 shows an alternative processes for accomplishing the step 46 of FIG. 3 for automatically merging the old and new scan sequence together seamlessly by comparing image histograms instead of the images themselves. In step 48, a window of frames is selected from the original or first recorded sequence starting with and working back from the last frame recorded before the motion picture film broke. In step 49, a window of frames is selected from second recorded sequence near the estimated position of where the frames are likely to match, as previously described for FIG. 8.

In step 56 one or more image histograms for each frame within the first window of frames is compared to the frame in the correspondingly positioned frame in the second window of frames. In step 57, if each of the histograms does not match the corresponding image histograms in step 57, then the second sequence of frames is shifted by one frame in step 58. The step of comparing each frame corresponding frame is repeated until corresponding frames within the first window of frames and the second window of frames. When the first window of frame and the second window of frames match, in step 56, then in step 59, the two sequences are merged with the redundant frames of either the first or second sequences discarded from the final video stream.

FIG. 12 shows an simplified alternative processes for accomplishing the step 46 of FIG. 3 for automatically merging the old and new scan sequence together seamlessly by aligning the reel motor reel rotation count and angular position reading of the last frame scanned for the old scan sequence with the reel rotation count and angular position reading of the new scan sequence. The reel rotation count and angular position reading can be measured using a standard rotational encoder, for example, an optical quadrature encoder, or alternatively a magnetic hall effect encoder, capable of outputting relative magnitude and direction. Using the optical quadrature encoder, absolute position can be calculated based on the number of pulses from the start position taking into account changes in direction. Alternatively, two encoders can be used, one to count each rotation of the motor shaft, and the other to count pulses within each turn of the motor shaft. This method depends on the operator not removing the film reels from the motion picture film digital scanning system 25 of FIG. 6. If the film reels are not removed, than the reel rotation count and angular position reading of a corresponding frame in the old scan sequence can match the reel rotation count and angular position reading of the same image in the new scan sequence.

In step 60, a reel motor rotation count and angular position reading can be associated with each frame of the first scan sequence and stored for later retrieval. In step 61, the reel rotation count and angular position reading at the frame where the splice failed and the film broke is flagged. In step 62, the motion picture film is rewound a pre-determined distance, as previously discussed. In step 63, the new scan sequence is automatically initiated after the film is rewound. A reel rotation count and angular position reading is associated with each frame of the second scan sequence in step 64. The first scan sequence and second scan sequence are merged with the second scan sequence starting the frame after the frame with the reel rotation count and angular position reading associated with the breakpoint.

Figure 13:
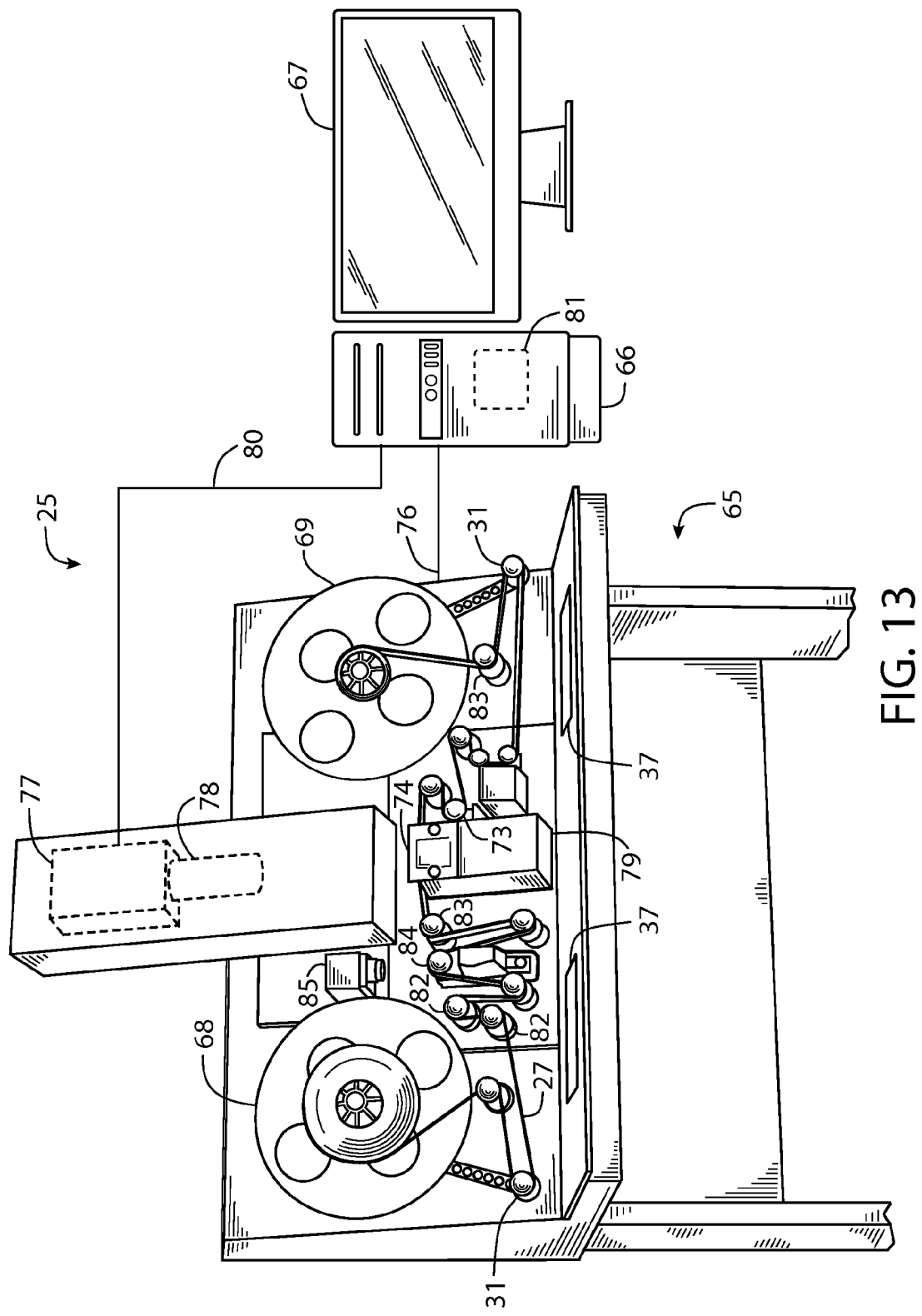
FIG. 13 shows a system and apparatus for scanning motion picture film capable of automatically recovering from a failed spliced or break after the defect is repaired.

FIG. 13 shows a system and apparatus for scanning motion picture film capable of automatically recovering from a failed spliced or break after the defect is repaired. Referring to FIG. 13, the motion picture film digital scanning system 25 includes a motion picture film digital scanner 65 and a processing unit 66. The processing unit 66 is shown in the form of a personal computer; however, this processing unit 66 can also be integrated within the motion picture film digital scanner 65. The processing unit 66, can be one or more microprocessors, microcontrollers, digital signal processors (DSP), field programmable gate arrays (FPGA), programmable logic devices (PLD), application specific integrated circuits (ASIC), either alone or in combination, or other devices capable of executing the instructions and meeting the performance requirements described herein. The instructions for executing the steps described in FIGS. 3, 8, 11, and 12 by the processing unit 66 are stored in memory. Memory can include, but is not limited, ROM, PROM, EPROM, flash memory, RAM, SRAM, DRAM, and ROM. The memory can be integrated into the processing unit 66 or separate from the processor. The processing unit 66 is shown connected to a display monitor 67. The display monitor 67 alternatively can be integrated with the processing unit 66 or integrated with the motion picture film digital scanner 65.

Figure 14:
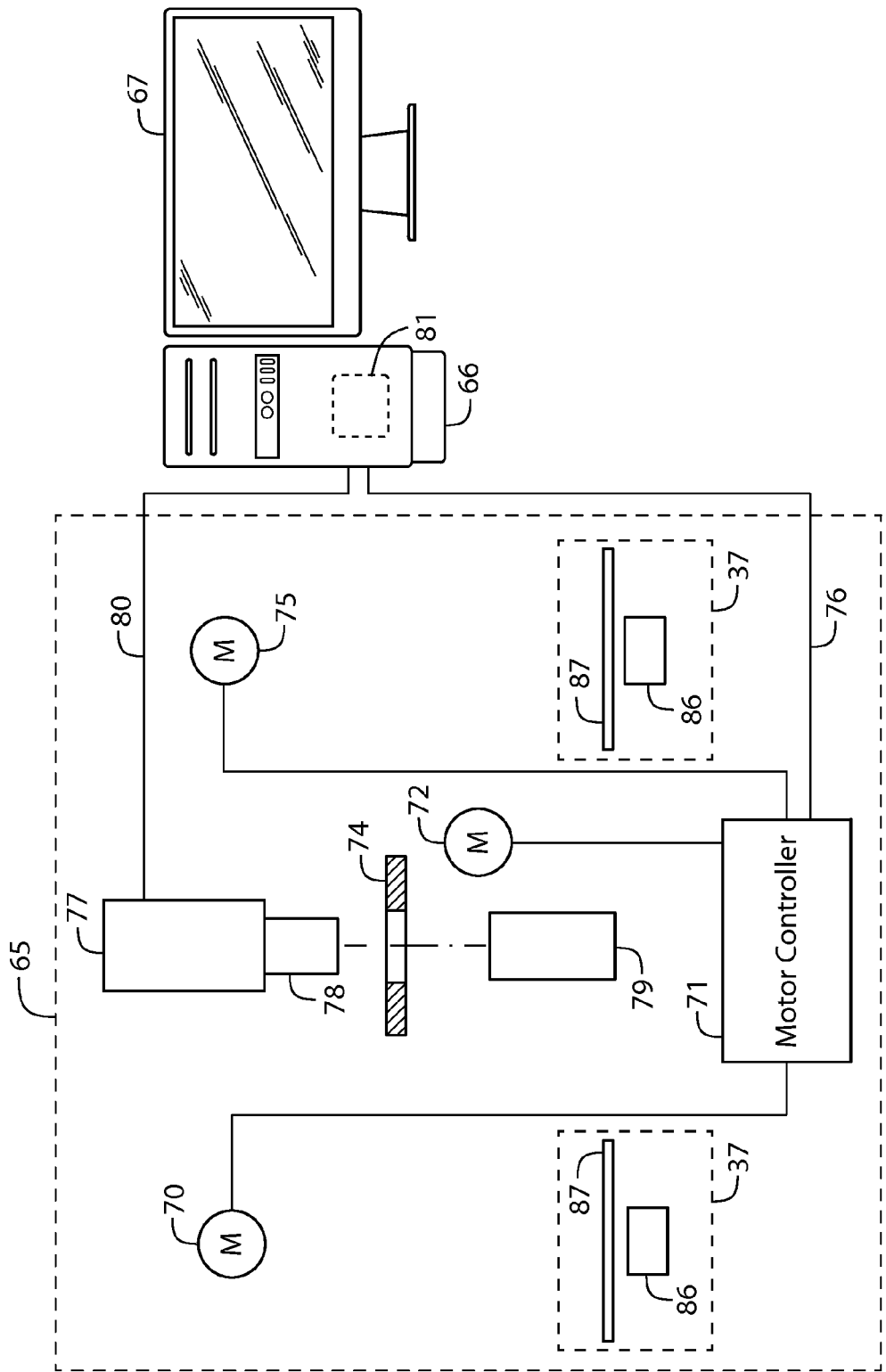
FIG. 14 shows a block diagram of FIG. 13.

The a motion picture film digital scanner 65 includes a supply reel 68 for supplying the motion picture film 27 to the a motion picture film digital scanner 65 and a take-up reel 69 for receiving the motion picture film 27 after it has been scanned. Referring to FIGS. 13-14, where FIG. 14 shows a block diagram of FIG. 13, a supply reel motor 70 in FIG. 4 drives the supply reel 68 of FIG. 13. A tension arm 31 in FIG. 13 is used by a motor controller 71 in FIG. 14 to regulate the speed of the supply reel motor 70 of FIG. 14. A capstan motor 72 in FIG. 14 drives a capstan roller 73 of FIG. 13. The capstan roller 73 keeps the film moving over a film gate 74. The capstan motor 72 speed is controlled by the motor controller 71. The take-up reel 69 of FIG. 13 is driven by a take-up reel motor 75 of FIG. 14. A tension arm 31 of FIG. 13 is used by a motor controller 71 to regulate the speed of the take-up reel motor 75 both of FIG. 14. While FIG. 14 shows a motor controller regulating the speed and direction of the supply reel motor 70, take-up reel motor 75, and capstan motor 72, some or all of these can also be controlled directly by the processing unit 66. In FIGS. 13-14, the processing unit 66 controls the motion picture film digital scanner 65 through a computer communication interface 76; for example, USB, Ethernet, or wireless 802.11.

Referring to FIGS. 13-14, the motion picture film 27 of FIG. 13, is scanned through the film gate 74 by a digital camera 77 and lens 78. The film is illuminated by a camera light source 79 through the film gate 74 to the lens 78. Each frame of the motion picture film 27 is digitally captured by the digital camera 77, in the example, an area array digital camera, and by strobing the camera light source 79, once per frame, in synchronization with each frame passing fully under the film gate 74. Alternatively, the image can be created continuously with the digital camera 77, in the form of a line sensor digital camera in combination with the camera light source 79 of constant illumination. Regardless of the method of scanning, the processing unit 66 can adjust the brightness of the camera light source 79. The lens and camera position can be adjusted to accommodate different motion picture film sizes, such as 8 mm, 16 mm, 35 mm, 65 mm, and 70 mm; motion picture frame sizes with different aspect ratios, such as 1.37:1 and 1.85:1 or 2.40:1; and spanning 1, 2, 3, or 4 vertical film perforations or even 8 horizontal perforations. The digitally scanned image stream from the digital camera 77 can be transmitted to the computer by a CameraLink interface 80. Other wired or wireless digital interfaces can be used capable of streaming digitized motion picture video images in real-time to the processing unit 66. For example, CameraLink, wired or wireless USB, FireWire, Thunderbolt, wired or wireless Serial Digital Interface (SDI, HD-SDI, or 3D-SDI) or Ethernet. The data can be stored in computer storage media 81 such as a hard drive or flash memory. Alternatively, the data can be stored externally to the processing unit 66 by connecting it to external storage such as USB drives, Storage Area Networks (SAN), or Network Attached Storage (NAS).

Referring to FIG. 13, the motion picture film is guided through a series of rollers along the film path between the supply reel 68, capstan roller 73, and the take-up reel 69. These include optional particle transfer rollers 82 which are disposed to remove dirt and debris from the film as well as guide rollers 83 that help to define the film path. The a motion picture film digital scanner 65 of FIG. 13 can include an optical sound reader light source 84 that illuminates the edge of the film, where the sound track resides, and an optical sound reader camera 85 for reading the illuminated sound track.

The a motion picture film digital scanner 65 of FIGS. 13-14 also includes the built-in inspection station 37, for example, a light table, which is optional, to help facilitate splicing in-place of the motion picture film 27 that has a failed or broken splice, without removal of the motion picture film 27 from the a motion picture film digital scanner 65. The built-in inspection station 37 includes a light source 86 and a diffuse translucent surface 87. The light source brightness can be optionally adjusted by the processing unit 66.

Figure 15:
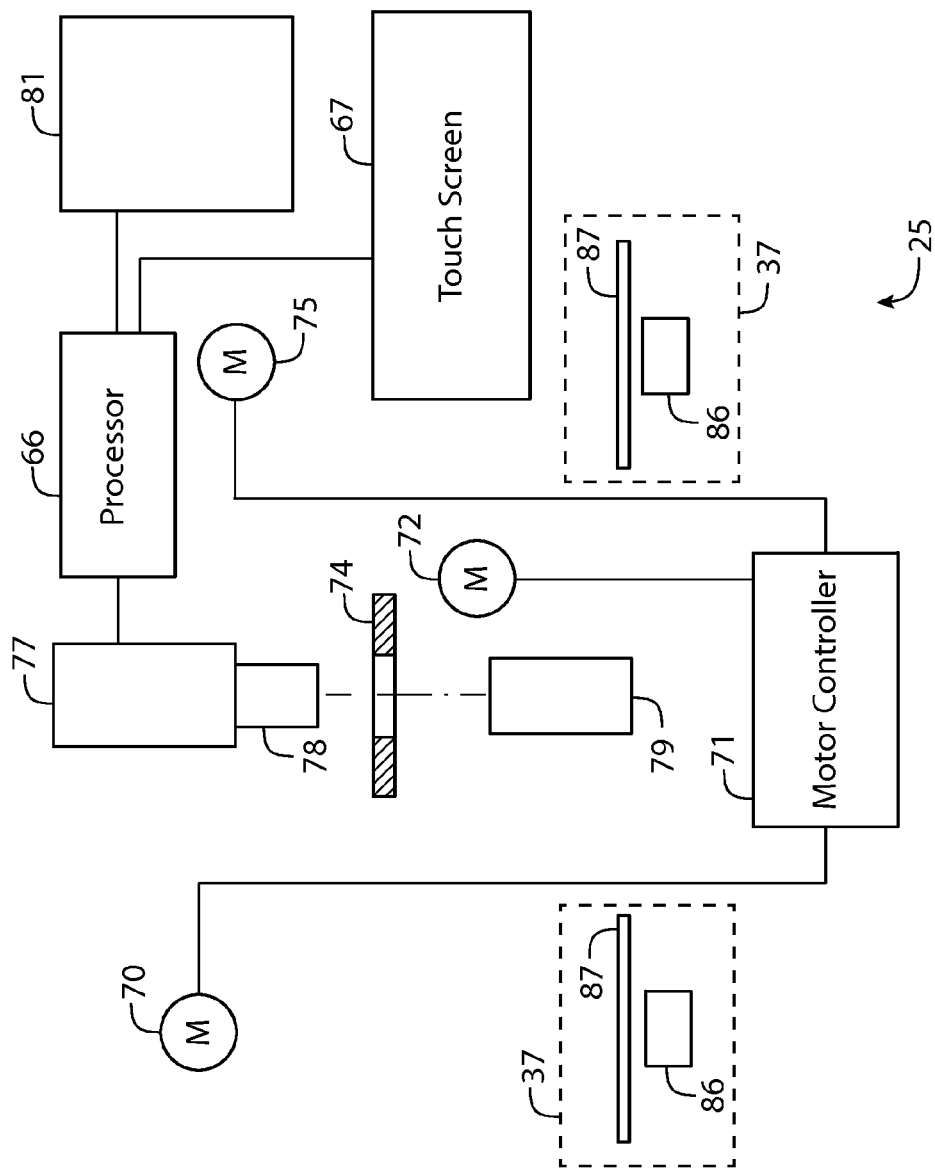
FIG. 15 shows a block diagram for an alternative system and apparatus where the motion picture film digital scanner, processing unit, and display monitor are integrated within a single enclosure.

FIG. 15 shows a block diagram for an alternative system and apparatus for scanning motion picture film capable of automatically recovering from a failed splice or break after the defect is repaired where the motion picture film digital scanning system 25, comprises one integrated device including a display monitor 67, processing unit 66, and computer storage media 81, digital camera 77, lens 78, film gate 74, camera light source 79, motor controller 71, supply reel motor 70, take-up reel motor 75, and built-in inspection station 37, and diffuse translucent surface 87 all comprise an integrated device within an enclosure. The processing unit 66 can be an integrated personal computer, personal computer motherboard, microprocessor, microcontroller, digital signal processor, field programmable gate array (FPGA), or any combination of the devices capable of executing instructions capable of streaming real-time audio and video and carrying out the processes described in this disclosure. The display monitor can be any integrated monitor, for example, a touch screen LCD, or OLED.

A motion picture film scanning apparatus, system, and method have been described for automatically recovering after splicing together broken motion picture film during the scanning process or alternatively, at the end of the scanning process. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A motion picture film digital scanning system, comprising:
    a motion picture film digital scanner;
    one or more processors; and
    a non-transitory computer-readable storage medium coupled to the one or more processors, and instructions stored in the storage medium that, when executed by the one or more processors causes the motion picture film digital scanner to perform operations including:
        digitally scanning a motion picture film portion, creating a first scan sequence;
        terminating automatically the first scan sequence, in response to the motion picture film portion breaking;
        automatically digitally scanning a second scan sequence, commencing at a position in the motion picture film portion before a last scanned frame of the first scan sequence;
        identifying automatically one or more overlapping frames from the first scan sequence and the second scan sequence; and
        editing together, automatically and seamlessly, the first scan sequence and the second scan sequence, and discarding redundant frames from a resulting merged sequence.

2. A motion picture film digital scanner of claim 1, further comprising:
    the one or more processors, after stopping automatically the first scan sequence and before automatically digital scanning the second scan sequence,
    automatically rewinding the motion picture film portion to before the last scanned frame of the first scan sequence.

3. The motion picture film digital scanning system of claim 1, wherein:
    the one or more processors causes the motion picture film digital scanner to iteratively create a one or more scan sequences in response a corresponding one or more breaking of the motion picture film portion;
    automatically identifying one or more overlapping frames between each successive scan sequence of the one or more scan sequences; and
    editing together, automatically and seamlessly, a corresponding successive scan sequences.

4. The motion picture film digital scanning system of claim 3, wherein the editing together, automatically and seamlessly, the corresponding successive scan sequences occurs during the scanning of the motion picture film portion.

5. The motion picture film digital scanning system of claim 3, wherein the editing together, automatically and seamlessly, the corresponding successive scan sequences occurs after the scanning of the motion picture film portion is completed.

6. The motion picture film digital scanning system of claim 1, wherein at least one of the one or more processors is within a standalone computer.

7. The motion picture film digital scanning system of claim 1, wherein at least one of the one or more processors is integral to the motion picture film digital scanner.

8. The motion picture film digital scanning system of claim 1, wherein the editing together automatically and seamlessly, the first scan sequence and the second scan sequence occurs after the scanning of the motion picture film portion is completed.

9. The motion picture film digital scanning system of claim 1, wherein the editing together automatically and seamlessly, the first scan sequence and the second scan sequence occurs during the scanning the motion picture film portion.

10. A method carried out by a motion picture film digital scanning system, the method comprising:
digitally scanning a motion picture film portion, creating a first scan sequence;
terminating automatically the first scan sequence, in response to the motion picture film portion breaking;
automatically scanning a second scan sequence commencing at a position in the motion picture film portion before a last scanned frame of the first scan sequence;
identifying automatically one or more overlapping frames from the first scan sequence and the second scan sequence;
editing together, automatically and seamlessly, the first scan sequence and the second scan sequence, and discarding redundant frames from a resulting merged sequence.

11. The method of claim 10, further comprising:
automatically rewinding the motion picture film portion to before the last scanned frame of the first scan sequence; and
performing automatic rewinding after stopping automatically the first scan sequence and before automatically digital scanning the second scan sequence.

12. The method of claim 10, further comprising:
iteratively creating a one or more scan sequences in response a corresponding one or more breaking of the motion picture film portion;
automatically identifying one or more overlapping frames between each successive scan sequence of the one or more scan sequences; and
editing together, automatically and seamlessly, a corresponding successive scan sequences.

13. The method of claim 12, wherein the editing together, automatically and seamlessly, the corresponding successive scan sequences occurs during the scanning of the motion picture film portion.

14. The method of claim 12, wherein the editing together, automatically and seamlessly, the corresponding successive scan sequences occurs after the scanning of the motion picture film portion is completed.

15. The method of claim 10 wherein the editing together automatically and seamlessly, the first scan sequence and the second scan sequence occurs after the scanning of the motion picture film portion is completed.

16. The method of claim 10 wherein the editing together automatically and seamlessly, the first scan sequence and the second scan sequence occurs during the scanning the motion picture film portion.

* * * * *